US012657716B2

(12) United States Patent
Williams et al.

(10) Patent No.: US 12,657,716 B2
(45) Date of Patent: Jun. 16, 2026

(54) GENERATING AGRONOMIC INFERENCES FROM EXTRACTED INDIVIDUAL PLANT COMPONENTS

(71) Applicant: Deere & Company, Moline, IL (US)

(72) Inventors: Daniel Williams, Sacramento, CA (US); Cameron Cruz, San Francisco, CA (US)

(73) Assignee: Deere & Company, Moline, IL (US)

( * ) Notice: Subject to any disclaimer, the term of this patent is extended or adjusted under 35 U.S.C. 154(b) by 461 days.

(21) Appl. No.: 18/200,132

(22) Filed: May 22, 2023

(65) Prior Publication Data

US 2024/0394884 A1     Nov. 28, 2024

(51) Int. Cl.
*G06T 7/00*          (2017.01)
*G06Q 50/02*       (2024.01)
(Continued)

(52) U.S. Cl.
CPC ........... *G06T 7/0014* (2013.01); *G06Q 50/02* (2013.01); *G06T 7/11* (2017.01); *G06V 10/761* (2022.01);
(Continued)

(58) Field of Classification Search
CPC .... G06V 10/761; G06V 10/762; G06V 10/82; G06V 20/68; G06V 20/188;
(Continued)

(56) References Cited

U.S. PATENT DOCUMENTS 10,186,029 B2     1/2019  Spalding et al.
2014/0376782 A1*  12/2014  Li ......................... G06T 7/0004
                                                                          382/110

(Continued)

OTHER PUBLICATIONS

Miller et al., "A robust, high-throughput method for computing maize ear, cob, and kernel attributes automatically from images" The Plant Journal (2017) 89, 169-178, doi:10.1111/tpj. 13320, dated Nov. 19, 2016.

(Continued)

*Primary Examiner* — Vu Le
*Assistant Examiner* — Tracy Mangialaschi
(74) *Attorney, Agent, or Firm* — Hanley, Flight & Zimmerman, LLC

(57)          ABSTRACT

Implementations are disclosed for analyzing extracted individual plant components to make agronomic inferences about entire composite plant organs from which the individual plant components were harvested, and for using those agronomic inferences for various purposes. In various implementations, individual plant component(s) may be sampled from multiple plant components removed from composite plant organ(s) that previously included the plant components. Digital image(s) may be captured of the sampled individual plant component(s) and processed based on machine learning model(s) to generate agronomic inference(s) about the composite plant organ(s) that previously included the plurality of plant components. Based on the agronomic inference(s), computing device(s) may render output that includes a diagnosis or recommendation for the grower about the field or the crops, and/or agricultural equipment (e.g., robots) may be operated automatically.

20 Claims, 6 Drawing Sheets

(51) Int. Cl.

| | | |
|---|---|---|
| *G06T 7/11* | (2017.01) | |
| *G06V 10/74* | (2022.01) | |
| *G06V 10/762* | (2022.01) | |

(52) U.S. Cl.
CPC .. *G06V 10/762* (2022.01); *G06T 2207/20081* (2013.01); *G06T 2207/30188* (2013.01)

(58) Field of Classification Search
CPC ....... G06T 7/0004; G06T 7/0014; G06T 7/11; G06T 2207/20084; G06T 2207/30188; G06T 2207/20081; G06Q 50/02
See application file for complete search history.

(56) References Cited

U.S. PATENT DOCUMENTS

| | | | |
|---|---|---|---|
| 2018/0025254 A1* | 1/2018 | Wellington .......... | G06V 10/993 |
| | | | 382/110 |
| 2021/0241482 A1 | 8/2021 | Ruelberg et al. | |
| 2022/0061216 A1 | 3/2022 | Heitmann et al. | |
| 2022/0138925 A1* | 5/2022 | Anderson ................. | G06T 7/62 |
| | | | 382/110 |

OTHER PUBLICATIONS

Li et al., "Corn Classification System based on Computer Vision" Symmetry 2019, 11, 591; doi:10.3390/sym10040591, 12 pages, dated Apr. 24, 2019.

Khaki et al, "DeepCorn: A Semi-Supervised Deep Learning Method for High-Throughput Image-Based Corn Kernel Counting and Yield Estimation" Elsevier. Retrieved from https://www.elsevier.com/open-access/userlicense/1.0/, 27 pages, dated Feb. 10, 2021.

Mark Licht "Estimating Corn Yields Using Yield Components" Iowa State University, Integrated Crop Management. Retrieved from https://crops.extension.iastate.edu/cropnews/2017/08/estimating-corn-yields-using-yield-components, 4 pages, dated Aug. 21, 2017.

"What accounts for variability in grain protein levels in corn?" The Ohio State University. Agronomic Crops Network. Retrieved from https://agcrops.osu.edu/newsletter/corn-newsletter/2018-01/what-accounts-variability-grain-protein-levels-corn. 5 pages.

Sonja Begemann "Diagnose Corn Ear Problems" AgWeb. Retreived from https://www.agweb.com/news/crops/com/diagnose-corn-ear-problems. 11 pages, dated Sep. 20, 2016.

Stephen D. Strachan "Corn Grain Yield in Relation to Stress During Ear Development" Crop Insights. vol. 26, No. 9, 5 pages, dated 2016.

"Stress During Ear Development Affects Corn Yield" Agronomy Notebook, Crops. 3 pages, dated Jul. 2, 2015.

Liu et al., "High-Throughput Phenotyping of Morphological Seed and Fruit Characteristics Using X-Ray Computed Tomography" Front. Plant Sci. 11:601475. doi:10.3389/fpls.2020.601475, 10 pages, dated Nov. 12, 2020.

Nguyen et al., "A Robust Automated Image-Based Phenotyping Method for Rapid Vegetative Screening of Wheat Germplasm for Nitrogen Use Efficiency" Front. Plant Sci. 10:1372. doi: 10.3389/fpls.2019.01372, 15 pages, dated Nov. 5, 2019.

\* cited by examiner

500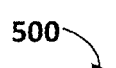

SAMPLE INDIVIDUAL PLANT COMPONENT(S) FROM A PLURALITY OF PLANT COMPONENTS REMOVED FROM COMPOSITE PLANT ORGAN(S) THAT PREVIOUSLY INCLUDED THE PLURALITY OF PLANT COMPONENTS
502

CAPTURE DIGITAL IMAGE(S) OF THE SAMPLED INDIVIDUAL PLANT COMPONENT(S)
504

PROCESS THE DIGITAL IMAGE(S) BASED ON ML MODEL(S) TO GENERATE AGRONOMIC INFERENCE(S) ABOUT THE COMPOSITE PLANT ORGAN(S) 506

GENERATE INDIVIDUAL PLANT COMPONENT EMBEDDINGS THAT REPRESENT THE SAMPLED INDIVIDUAL PLANT COMPONENTS 506A

DETERMINE SIMILARITY MEASURES BETWEEN INDIVIDUAL PLANT COMPONENT EMBEDDINGS AND REFERENCE INDIVIDUAL PLANT COMPONENT EMBEDDINGS GENERATED PREVIOUSLY 506B

BASED ON THE SIMILARITY MEASURES AND GROUND TRUTH AGRONOMIC OBSERVATIONS ABOUT REFERENCE COMPOSITE PLANT ORGANS THAT YIELDED REFERENCE INDIVIDUAL PLANT COMPONENTS, GENERATING AGRONOMIC INFERENCES 506C

BASED ON THE AGRONOMIC INFERENCE(S), CAUSE COMPUTING DEVICE(S) TO RENDER OUTPUT THAT INCLUDES A DIAGNOSIS OR RECOMMENDATION FOR THE GROWER ABOUT THE FIELD OR THE CROPS
508

BASED ON THE AGRONOMIC INFERENCE(S), OPERATE ONE OR MORE AGRICULTURAL ROBOTS TO PERFORM ONE OR MORE AGRICULTURAL TASKS IN A FIELD
510

Fig. 5

GENERATING AGRONOMIC INFERENCES FROM EXTRACTED INDIVIDUAL PLANT COMPONENTS

BACKGROUND

In many large-scale agricultural fields, crop yield may be one of the few data points that can be collected reliably and/or economically. For example, yield monitors may be operated onboard combine harvesters to measure the rate at which clean grain enters a grain tank. This measurement conveys how much of the plant component of interest—corn kernels, wheat seeds, etc.—was obtained, but does not provide any explanation as to why that amount was obtained.

In many cases it is possible to determine causes and/or contributing factors of crop yield by examining physical characteristics of larger portions of crops, such as entire plants or composite plant organs. For example, the visual appearance of an ear of corn can be observed to identify conditions such as phosphate shortages, insufficient population, nitrogen deficiency/surplus, low fertility, potash shortage, or over/under hydration, to name a few. Before such observation can be performed, however, individual plant components such as corn kernels or wheat seeds often are removed from composite plant organs and intermixed. Consequently, it may no longer be possible to use conventional techniques to perform analytics on composite plant organs or based on specific locations, e.g., because any geospatial references of individual plant components are lost.

SUMMARY

Implementations are described herein for analyzing extracted individual plant components to make agronomic inferences (e.g., predictions) about entire composite plant organs such as ears of corn or heads of wheat from which the individual plant components were harvested. Additionally, techniques are described herein for using these agronomic inferences to generate subfield diagnoses, recommendations, and/or to control automated agricultural equipment.

In various implementations, a method may be implemented using one or more processors and may include: sampling one or more individual plant components from a plurality of plant components removed from one or more composite plant organs that previously included the plurality of plant components, wherein the one or more composite plant organs are part of crops in a field managed by a grower; capturing one or more digital images of the sampled one or more individual plant components; processing the one or more digital images based on one or more machine learning models to generate one or more agronomic inferences about the one or more composite plant organs that previously included the plurality of plant components, wherein one or more of the machine learning models was trained previously based on training data associating reference individual plant components with ground truth agronomic observations about one or more reference composite plant organs that yielded the reference individual plant components; and based on the one or more agronomic inferences, causing one or more computing devices to render output that includes a diagnosis or recommendation for the grower about the field or the crops.

In various implementations, the output may include subfield recommendations for the field managed by the grower, one or more mid-crop-cycle agronomic recommendations, and/or a local environmental zone map for the field, to name a few examples. In various implementations, the individual plant components may be corn kernels, and the composite plant organs may be ears of corn. In various implementations, the individual plant components may be wheat seeds, and the composite plant organs may be heads of wheat.

In various implementations, the one or more individual plant components may be sampled by a component onboard a combine harvester operating in the field. In various implementations, the processing may include segmenting the sampled one or more individual plant components within the one or more digital images.

In various implementations, the sampled one or more individual plant components may include a sampled plurality of individual plant components, and the processing may include generating a plurality of individual plant component embeddings that represent the sampled plurality of individual plant components within the one or more digital images.

In various implementations, the method may include: determining similarity measures between the plurality of individual plant component embeddings and individual plant component reference embeddings generated previously based on the plurality of reference individual plant components; and based on the similarity measures and at least some of the ground truth agronomic observations about one or more of the reference composite plant organs that yielded the reference individual plant components, generating one or more of the agronomic inferences about the one or more composite plant organs that previously included the plurality of plant components.

In various implementations, the method may include determining similarity measures between the plurality of individual plant component embeddings; and based on the similarity measures, clustering the plurality of individual plant component embeddings into clusters, with each cluster representing an archetype composite plant organ.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is a flowchart of an example method for practicing aspects of the present disclosure, in accordance with various implementations described herein.

DETAILED DESCRIPTION

Figure 1:
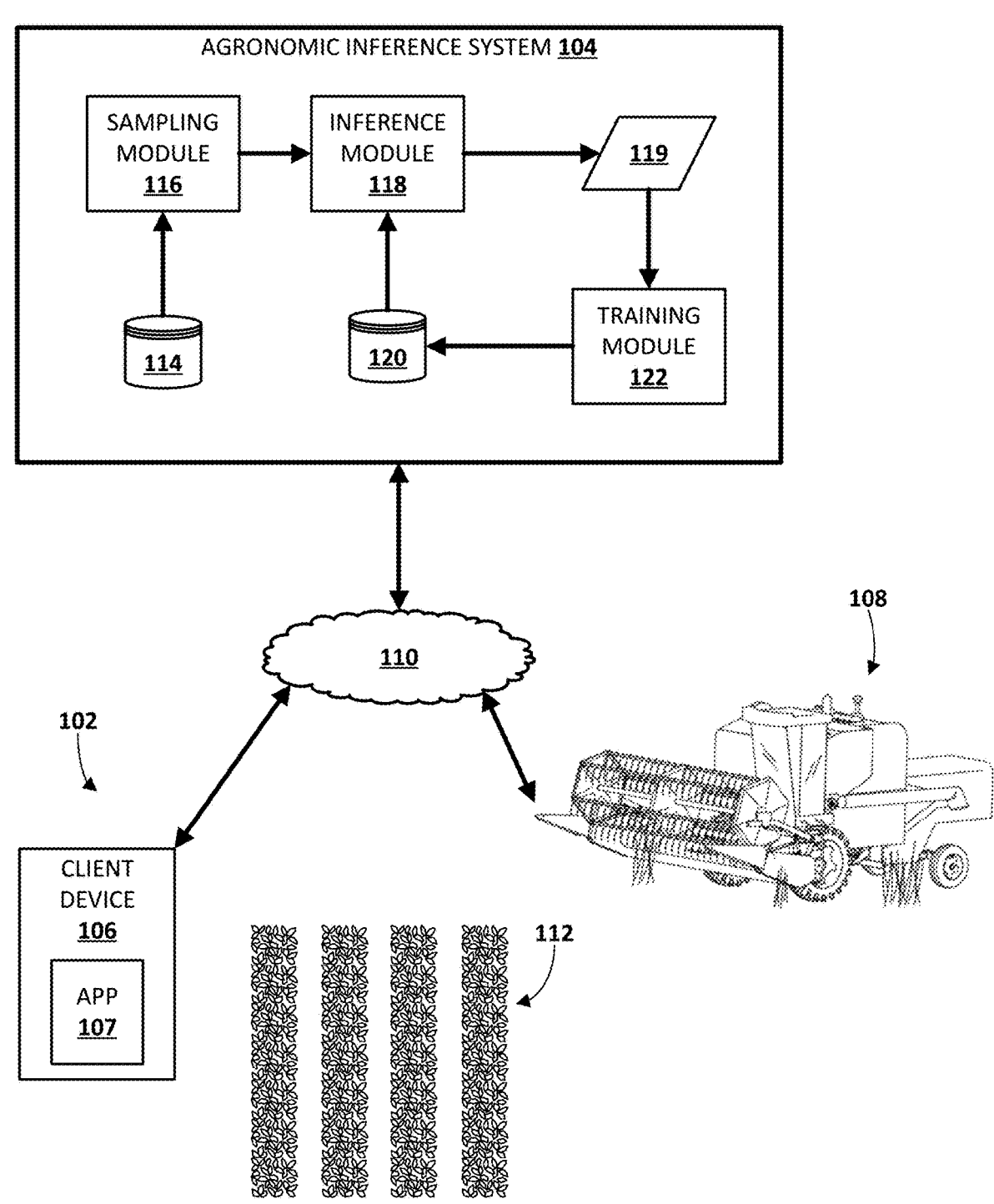
FIG. 1 schematically depicts an example environment in which disclosed techniques may be employed in accordance with various implementations.

Implementations are described herein for analyzing extracted individual plant components to make agronomic inferences (e.g., predictions) about entire composite plant organs such as ears of corn or heads of wheat from which the individual plant components were harvested. Additionally, techniques are described herein for using these agronomic inferences to generate subfield diagnoses, recommendations, and/or to control automated agricultural equipment.

In various implementations, individual plant components that have been separated from composite plant organs—corn kernels from ears of corn or wheat seeds from heads of wheat, for instance—may be sampled, e.g., using a grain isolation mechanism, such as a seed meter, which is deployed as part of a combine harvester. Digital images capturing these sampled individual plant components may then be processed using one or more vision techniques (e.g., rules-based vision techniques such as adaptive thresholding, contour detection, or the watershed algorithm, or techniques based on the application of machine learning model(s)) to generate agronomic inference(s). These agronomic inference(s) may include, for instance, inferences or predictions about an entire composite plant organ from which the individual plant components were harvested. With ears of corn, the agronomic inference(s) may include inferences that are normally made based on visual evaluation of entire ears of corn, such as predictions regarding abiotic and/or biotic factors, phosphate shortages, insufficient population, nitrogen deficiency/surplus, low fertility, potash shortage, over/under hydration, and/or plant-to-plant competition, to name a few.

In some implementations, agronomic inference(s) generated using these various vision techniques may be used to provide subfield recommendations and/or guidance to growers about specific portions of fields. As a combine harvester is traversed through a field, its position may be tracked, e.g., using technologies such as the Global Positioning System (GPS) to obtain position coordinates periodically/continuously. The harvester's tracked position coordinates may be at least loosely associated with contemporaneously harvested individual plant components. The agronomic inferences generated from digital images depicting these sampled individual plant components may then also be associated with the position coordinates, and hence, specific portions of a field. Thus, for instance, a grower may receive subfield recommendations for the field managed by the grower, e.g., as a heat map or a map segmented into portions for which different recommendations and/or diagnoses are made.

As noted previously, rules-based vision techniques (e.g., adaptive thresholding, contour detection, watershed) and/or machine-learning vision techniques may be employed to generate agronomic inferences. In the latter case, various types of machine learning models may be trained to facilitate generation of various types of agronomic inferences and/or predictions. In some implementations, one or more convolutional neural networks (CNNs) of various configurations may be trained to segment the images into different semantic portions, including portions representing individual plant components. Additionally or alternatively, the CNN(s) may be trained to extract various features of those segmented individual plant components, e.g., in the form of discrete and/or continuous embeddings or vectors.

These extracted features (e.g., embeddings) may be mapped, e.g., by what will be referred to herein as "mapping" machine learning model(s) (or layers of larger machine learning models), to ground truth agronomic observations about reference individual plant components. The reference individual plant components may not have been harvested from composite plant organs until after ground truth agronomic observations about the composite plant organs (e.g., detected physical traits, diagnoses, measurements, etc.) were obtained by humans, machines, robots, etc. Consequently, the mapping machine learning model(s) can be trained by applying data indicative of the reference individual plant components as inputs into the mapping machine learning model(s) to generate predicted agronomic inference(s), and training the mapping machine learning model(s) based on comparing the predicted agronomic inference(s) to the ground truth agronomic observations, e.g., using techniques such as gradient descent, back propagation, cross entropy, etc. Once trained, the mapping machine learning models can be applied to data indicative of sampled individual plant components (e.g., for which little or no ground truth data is available about composite plant organs) to generate agronomic inferences(s) about the composite plant organs from which those individual plant components were harvested. Various types of machine learning models may be trained as the mapping machine learning model(s), such as a multilayer perceptron (e.g., a neural network), transformer (of a type sometimes used for large language models), hidden Markov model(s), CNNs, support vector machines, etc.

In some implementations, individual plant components may be grouped into clusters based on their similarities to each other. Each cluster may represent an inferred composite plant organ that is an "archetype" that models "real" composite plant organ(s) from which individual plant components of the cluster likely would have been extracted. For example, a plurality of individual corn kernel embeddings may be generated to represent a sampled plurality of individual corn kernels that are depicted in digital image(s) captured in a combine harvester. Similarity measures may be determined between the plurality of individual corn kernel embeddings, e.g., using techniques such as Euclidean distance, dot product, cosine similarity, etc. The plurality of individual corn kernel embeddings may then be grouped into clusters of similar corn kernel embeddings. Each cluster may represent an archetype ear of corn that would likely have yielded corn kernels having those qualities found in the cluster.

In some implementations, individual plant component embeddings may be used to determine agronomic inference(s) about composite plant parts. For example, similarity measures may be determined between the plurality of individual corn kernel embeddings and reference individual corn kernel embeddings generated previously based on a plurality of reference corn kernels for which ground truth agronomic observations are available. Based on these similarity measures, suitable ground truth agronomic observations may be attributed to the individual corn kernel embeddings generated based on the sample corn kernels.

FIG. 1 schematically illustrates one example environment in which one or more selected aspects of the present disclosure may be implemented, in accordance with various implementations. The example environment depicted in FIG. 1 relates to the agriculture domain, but this is not meant to be limiting. Techniques described here may be useful in any domain in which individual components are extracted from larger composite components.

The environment of FIG. 1 includes one or more farms 102 and an agronomic inference system 104 connected by one or more computer networks 110. Farm 102 also includes one or more client devices 106, one or more fields 112 that are used to grow one or more crops, and agricultural equipment such as a combine harvester 108 that is configured, among other things, to capture images depicting individual plant components as described herein. Field(s) 112 may be used to grow various types of crops that may produce plant parts of economic and/or nutritional interest. These crops may include but are not limited to strawberries, tomato plants, soybeans, corn, lettuce, spinach, beans, cherries, nuts, cereal grains (e.g., wheat), berries, rice, flax, grapes, and so forth. One farm 102 is depicted in detail in FIG. 1 for illustrative purposes. However, there may be any number of farms for which agronomic inferences generated as described herein may be useful.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Agronomic inference system 104 comprises a non-limiting example of a computing system on which techniques described herein may be implemented. Each of client devices 106 and agronomic inference system 104 may include one or more memories for storage of data and software applications, one or more processors for accessing data and executing applications, and other components that facilitate communication over a network. The computational operations performed by client device 106 and/or agronomic inference system 104 may be distributed across multiple computer systems. Client device 106 may operate a variety of different applications that may be used, for instance, to analyze various agricultural inferences. For example, client device 106 operates an application 107 (e.g., which may be standalone or part of another application, such as part of a web browser), which a user can use to trigger generation of and/or view agronomic inferences generated as described herein.

In various implementations, agronomic inference system 104 may include a sampling module 116, an inference module 118, and a training module 122. Agronomic inference system 104 may also include one or more databases 114, 120 for storing various data used by and/or generated by modules 116, 118, and/or 122. For example, database 114 may store data such as images, e.g., captured in a combine harvester 108, that depict individual plant components (e.g., kernels of corn, wheat seeds) stripped from larger composite plant organs (e.g., ears of corn, heads of wheat), other sensor data gathered by farm equipment and/or personnel on the ground, user-input data, weather data, and so forth. Database 120 may store machine learning model(s) that are applied by inference module 118 to generate agronomic inferences 119 and/or are trained by training module 122. In some implementations one or more of modules 116, 118, and/or 122 may be omitted, combined, and/or implemented in a component that is separate from agronomic inference system 104, such as on client device 106 and/or in combine harvester 108. In some implementations, agronomic inference system 104 may be considered cloud-based computing resources as it may be implemented across one or more computing systems that may be referred to as the "cloud."

In some implementations, sampling module 116 may be configured to sample images that depict individual plant components such as kernels of corn or seeds of wheat that have been extracted (e.g., stripped), e.g., by agricultural equipment such as combine harvester 108, from larger composite plant organs such as ears of corn or heads of wheat. In some implementations, images captured by combine harvester 108 or other similar agricultural equipment may be stored in database 114, and sampling module 116 may sample these images from database 114 for further processing. In other implementations, sampling module 116 may be integral with combine harvester 108 or other similar agricultural equipment and may be configured to control not only capturing images of individual plant components, but also to control one or mechanical apparatus (one example is depicted in FIG. 4) that are designed to sample individual plant components from a larger stream of plant components being harvested.

Inference module 118 may be configured to process images of individual plant components provided by sampling module 116 using one or more machine learning models stored in database 120 to generate agronomic inferences 119 as described herein. Various types of machine learning models may be applied by inference module 118 to generate these agronomic inferences 119, which may include predictions and/or classifications. Additionally, various types of machine learning models may be used to generate semantically rich embeddings that are applied as inputs and/or intermediate representations across the various machine learning models. These various machine learning models may include, but are not limited to, recurrent neural networks (RNNs), long short-term memory (LSTM) networks (including bidirectional), gated recurrent unit (GRU) networks, graph neural networks (GNNs), transformer networks (e.g., the same as or similar to those often used as large language models), feed-forward neural networks, convolutional neural networks (CNNs), support vector machines, random forests, decision trees, etc. As used herein, a "transformer" may include, but is not necessarily limited to, a machine learning model that incorporates a "self-attention" mechanism, and that is usable to process an entire sequence of inputs at once, as opposed to iteratively. One non-limiting example of a transformer is a transformer trained based on the Bidirectional Encoder Representations from Transformers (BERT) concept.

Training module 122 may be configured to train the various machine learning models used by inference module 118 to generate agronomic inferences as described herein. These machine learning models may include those stored in database 120, as well as other machine learning models that are employed to encode various modalities of input data into embeddings. In various implementations, training module 122 may be configured to train transformers and other types of models to generate agronomic inferences based on images of extracted individual plant components such as corn kernels or wheat seeds.

Figures 2A, 2B:
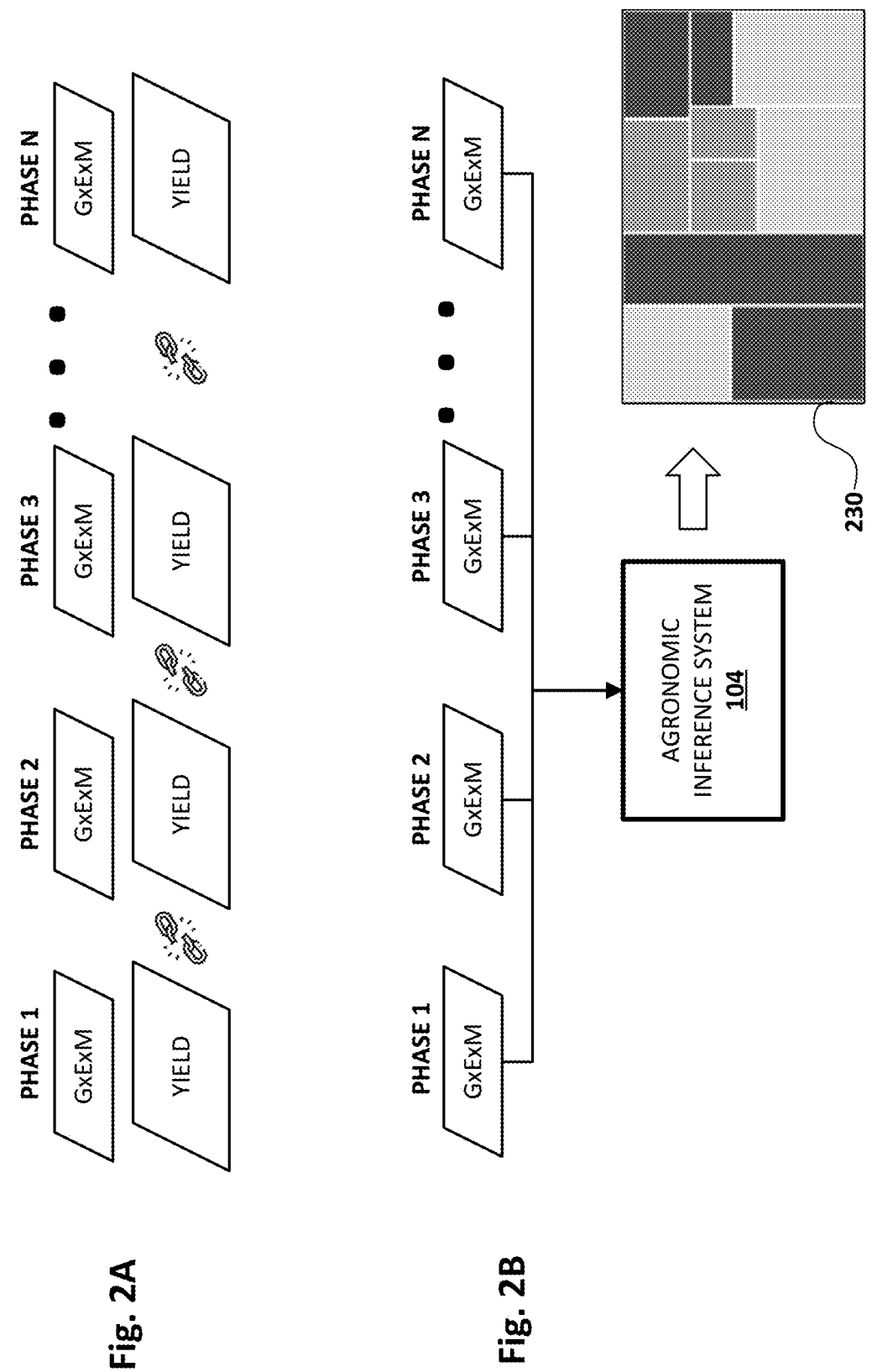
FIG. 2A and FIG. 2B schematically depict examples of how various data may be gathered and used during various stages of an agricultural operation, in accordance with various embodiments.

FIG. 2A demonstrates the disjointed nature of multi-phase testing, development, and deployment of a varietal of crop commercially. Multiple phases of a typical agricultural operation are depicted in FIG. 2A. Genotype, environment, and management (G×E×M) data is obtained from multiple phases of the agricultural operation. For instance, "PHASE 1" shown at left may correspond to early pipeline trials and/or research and development of the agricultural operation in which particular varietals of a crop such as corn or wheat are initially tested, e.g., in a small test bed. The next phase to the right, "PHASE 2," may correspond to pre-commercial trials of the agricultural operation in which the crop varietals are tested on a somewhat larger scale. The next phase to the right, "PHASE 3," may correspond to more advanced agronomic development trials in which different management techniques are tested a wider scale to finalize agronomic techniques that will be used commercially. This may continue until "PHASE N," which may correspond to the crop being grown commercially on a wide scale.

During each phase, a crop yield may be generated. However, as shown by the broken chains, the G×E×M is fragmented between phases, and consequently, the crop yield data is also fragmented. Put another way, there is insufficient data to connect knowledge across the various domains associated with the multiple phases, including the environments and agronomic systems deployed in each. Crop yield alone does not provide sufficient information to diagnose why a specific commercial field or portion thereof (e.g., an acre) is underperforming, overperforming, etc.

As shown in FIG. 2B, agronomic inference system 104 may facilitate the linking of G×E×M and yield data across the various phases/domains depicted in FIG. 2A using kernel-level or individual grain/seed-level imagery. This may allow accurate agronomic diagnoses and recommendations to be generated during later phases. In particular, agronomic inference system 104 is able to capture the G×E×M data at each phase and link it together to generate agronomic inferences (119 in FIG. 1) such as a map 230 showing portions of an agricultural field that exhibit different inferred agronomic traits and/or recommendations. Based on such a map 230, a grower is able to apply fine-tuned, granular agronomy to diagnose and/or properly manage crops growing in different portions of the field. For example, different colored portions of map 230 may correspond to different agronomic recommendations, such as apply more/less fertilizer (e.g., map 230 may be a nitrogen prescription map), apply more/less irrigation, treat with particular herbicide or pesticide, etc.

Figure 3:
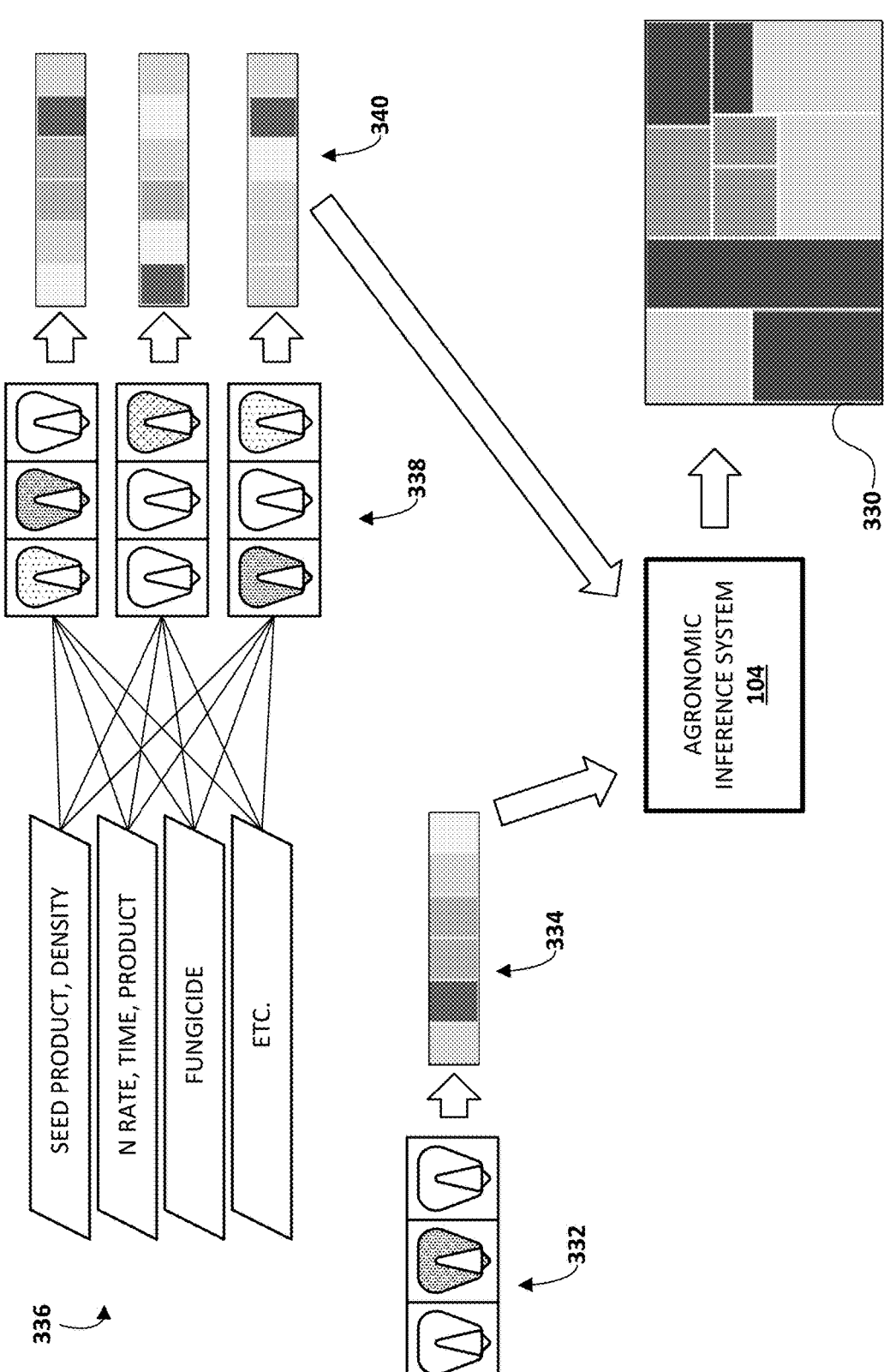
FIG. 3 schematically depicts an example of how various aspects of the present disclosure may be implemented, in accordance with various embodiments.

FIG. 3 schematically depicts an example of how to link the previously disjoint data depicted in FIG. 2A. Starting at left, agronomic inference system 104, e.g., by way of inference module 118 (not depicted in FIG. 3), may process digital image(s) 332 depicting individual plant components to generate plant component embedding(s) 334. For example, inference module 118 may process digital image(s) 332 captured inside combine harvester 108 using a CNN and/or transformer to generate plant component embeddings 334. Embeddings 334 may be, for instance, continuous vector embeddings.

Before, during, or after agronomic inference system 104 generates plant component embeddings 334, agronomic inference system 104, e.g., by way of inference module 118 or training module 122, may process reference digital images 338 depicting reference individual plant components that were extracted during earlier phases of FIGS. 2A-B, such as during R&D, when high-quality reference G×E×M data 336 was available. Reference G×E×M data 336 may be ground truth observational data that corresponds to (e.g., be used as training labels for learning) the types of agronomic inferences that are generated using techniques described herein. Based on this processing, individual plant component reference embedding(s) 340 may be generated. Reference G×E×M data 336 may be linked to individual plant component reference embedding(s) 340, e.g., by training module 122 training one or more machine learning models stored in database 120 to learn mapping(s) between individual plant component reference embedding(s) 340 and reference G×E×M data 336.

The machine learning model(s) trained to learn mapping(s) between individual plant component reference embedding(s) 340 and reference G×E×M data 336 (referred to herein as "mapping machine learning models") can then be used, e.g., by inference module 118, to generate agronomic inference(s) about composite plant organs (e.g., ears of corn, heads of wheat) from which the individual plant components depicted in digital images 332 were extracted. For example, visual features of digital images 332 can be encoded, e.g., by inference module 118, into embedding(s) 334. Then, embeddings 334 may be processed, e.g., by inference module 118 using mapping machine learning model(s), to generate agronomic inferences about archetype composite plant organs that would likely have yielded the individual plant components depicted in digital images 332. Based on these agronomic inferences, as well as based on other data such as position coordinates associated with images 332 depicting individual plant components, it is possible for agronomic inference system 104 to generate diagnoses (e.g., plant stress, nitrogen deficiency, dehydration, etc.) and/or recommendations, such as a prescription map 330 for managing a field.

Figure 4B:
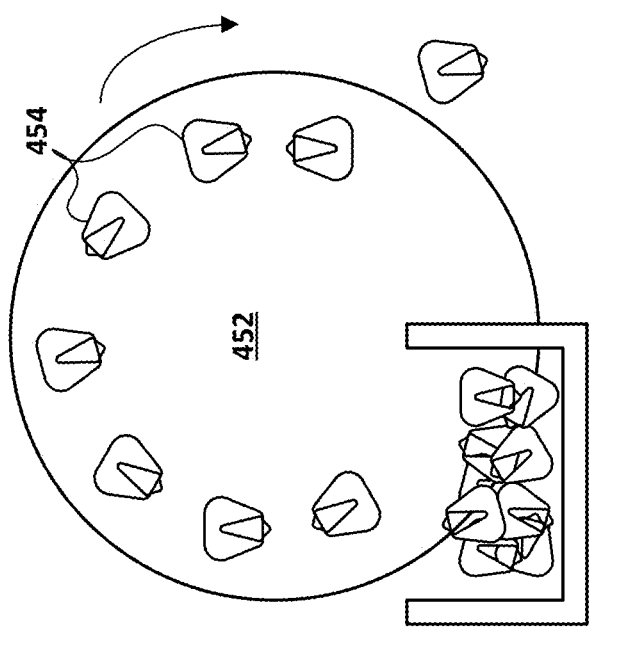
FIG. 4A and FIG. 4B schematically depict an example of how individual plant components may be sampled and photographed for additional processing as described herein.
Figure 4A:
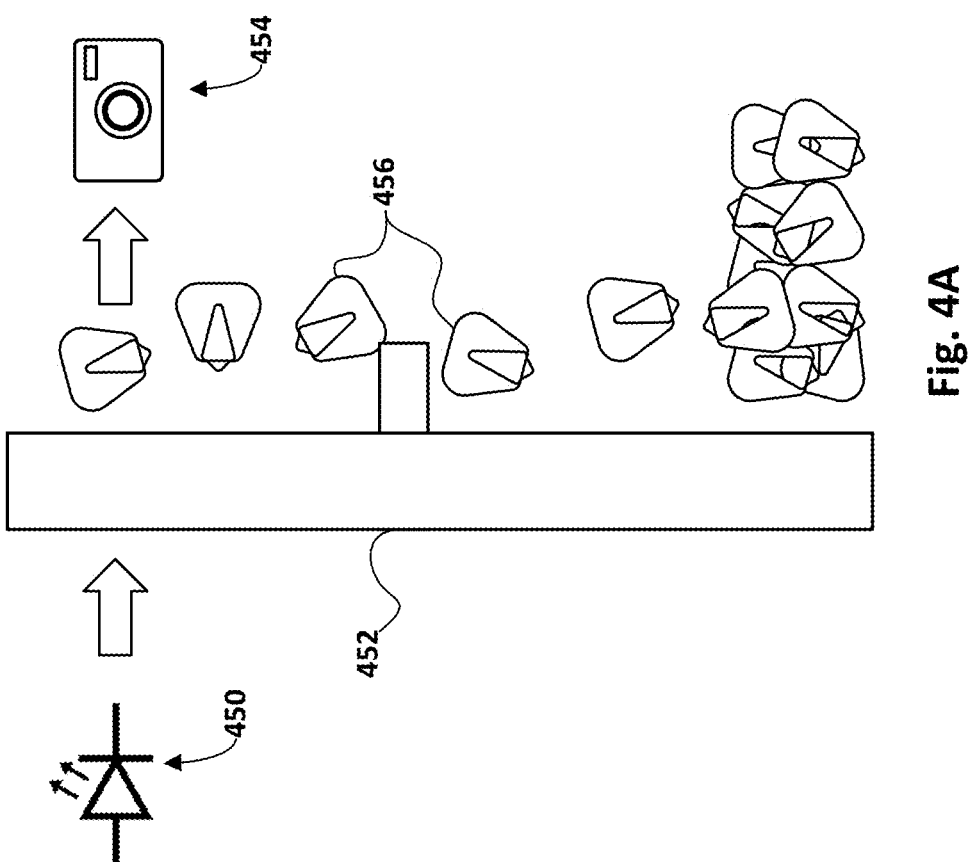

FIGS. 4A and 4B schematically depict a non-limiting example of how images of individual corn kernels 456 may be captured, e.g., inside of a combine harvester 108, in accordance with various implementations. FIG. 4A is a side view and FIG. 4B is a front view. A grain isolation/singulation mechanism 452 (e.g., a seed meter or other similar mechanical apparatus) is provided that is configured to rotate and collect corn kernels 456 (or other types of seeds or grains, depending on the application) on an individual and/or group basis for purposes such as controlled deposit, counting, etc.

In various implementations, a light source 450 such as an LED light may be placed proximate grain isolation/singulation mechanism 452 and may be configured to emit various colors of electromagnetic radiation (e.g., light) depending on factors such as the type of individual plant component being photographed, physical characteristics of grain isolation/singulation mechanism 452 and/or the agricultural equipment (e.g., combine harvester 108) in which grain isolation/singulation mechanism 452 is deployed, and so forth. A vision sensor 454 such as various types of 2D and/or 3D digital cameras may also be placed proximate grain isolation/singulation mechanism 452, e.g., on the opposite side from light source 450 as depicted in FIG. 4A. In the depicted configuration, light source 450 may provide back lighting that passes through corn kernels 456 and is captured by vision sensor 454. This may provide rich visual data that can then be processed, e.g., by inference module 118 using one or more machine learning models stored in database 120, to generate agronomic inferences about whole ears of corn or even entire corn plants from which corn kernels 456 were harvested.

FIG. 5 illustrates a flowchart of an example method 500 for practicing selected aspects of the present disclosure. For convenience, operations of method 500 will be described as being performed by a system configured with selected aspects of the present disclosure, such as agronomic inference system 104. Other implementations may include additional operations than those illustrated in FIG. 5, may perform operation(s) of FIG. 5 in a different order and/or in parallel, and/or may omit one or more of the operations of FIG. 5.

At block 502, the system, e.g., by way of sampling module 116 operating within combine harvester 108, may sample one or more individual plant components from a plurality of plant components removed from one or more composite plant organs that previously included the plurality of plant components. In various implementations, the composite plant organ(s) may be part of crops in a field managed by a grower. The types of crops that can be harvested by combine harvester 108, and from which individual plant components can be sampled in block 502, may include, but are not limited to, corn (maize), flax (linseed), wheat, rice, oats, rye, barley, sorghum, soybeans, rapeseed, sunflowers, and so forth. For example, and as depicted in FIG. 4, grain isolation/singulation mechanism 452 may be operated to isolate (at least temporarily) individual plant components such as corn kernels so that those components may be irradiated by light source 450 and captured in digital image(s) by vision sensor 454. To this end, at block 504, the system, e.g., by way of sampling module 116 and/or inference module 118 using vision sensor 454, may capture one or more digital images of the sampled (e.g., temporarily isolated from other components using grain isolation/singulation mechanism 452) one or more individual plant components.

At block 506, the system, e.g., by way of inference module 118, may process the one or more digital images based on one or more machine learning models, such as the mapping models described herein, to generate one or more agronomic inferences about the one or more composite plant organs that previously included the plurality of plant components. In the context of corn, for instance, the agronomic inferences may include, but are not limited to, phosphate shortages, too much or too little nitrogen, low fertility (e.g., caused by insufficient fertilizer), other abiotic and/or biotic factors, plant-to-plant competition, quantification of the impact of beneficial microbes on crops, and/or too much or too little irrigation/hydration, to name a few.

In various implementations, one or more of the machine learning models may have been trained previously, e.g., by training module 122, based on training data associating reference individual plant components with ground truth agronomic observations about one or more reference composite plant organs that yielded the reference individual plant components. For example, ground truth agronomic observations may include the GxExM data depicted in FIGS. 2A and 2B in association with the earlier phases (e.g., PHASE 1, PHASE 2, PHASE 3) and/or the reference GxExM data 336 depicted in FIG. 3. In various implementations, during training, training module 122 (or inference module 118) may process reference digital images 338 and/or embeddings 340 generated therefrom using a mapping machine learning model to generate agronomic inferences, such as inferred seed productivity and/or density, inferred applied nitrogen rate ("N rate" in FIG. 3) over time and/or per product, inferred fungicide applied, and so forth. These agronomic inferences may be compared, e.g., by training module 122, to ground truth reference GxExM data 336 to determine error(s). Based on these error(s), training module 122 may train the mapping machine learning model, e.g., using techniques such as gradient descent, back propagation, cross entropy, and so forth.

Referring back to FIG. 5, the processing of block 506 may include a variety of different sub operations. For instance, at block 506A, the system, e.g., by way of inference module 118, may generate individual plant component embeddings (e.g., 334 in FIG. 3) that represent the individual plant components sampled at block 502. For example, inference module 118 may process the digital image(s) captured at block 504 using a CNN or transformer to generate semantically rich individual plant component embeddings.

At block 506B, the system, e.g., by way of inference module 118, may determine similarity measures between individual plant component embeddings (e.g., 334) and individual plant component reference embeddings (e.g., 340 in FIG. 3) generated previously. In various implementations, these similarity measures may be determined using techniques such as Euclidean distance, dot product, cosine similarity, etc.

Based on the similarity measures determined at block 506B, as well as on ground truth agronomic observations (e.g., 336 in FIG. 3) about reference plant organs that yielded the reference individual plant components at block 506C, the system, e.g., by way of inference module 118, may generate agronomic inferences (e.g., 119 in FIG. 1). For instance, based on the similarity measures, the individual plant component embeddings (e.g., corn kernels) may be most similar to (e.g., clustered with) individual plant component reference embeddings generated from composite plant organs (e.g., ears of corn) that had exhibited visual characteristics indicative of nitrogen deprivation. Thus, nitrogen deprivation may be inferred for composite plant organs (e.g., whole ears of corn that were discarded before there was an opportunity to observe them directly and draw agronomic conclusions from those direct observations) from which the individual plant components were harvested.

Based on the agronomic inferences, at block 508, the system may cause one or more computing devices, such as client device 106, to render output that includes a diagnosis or recommendation for a grower about a field, portion of a field, and/or crops growing in the field or portion thereof. In various implementations, the output may include, for instance, subfield recommendations for the field managed by the grower, one or more mid-crop-cycle agronomic recommendations, a local environmental zone map (e.g., rendered as a heat map) for the field, and so forth. In other implementations, at block 510, the agronomic inferences and/or diagnoses may be used to control agricultural equipment. For example, an autonomous agricultural vehicle or robot (e.g., a rover, drone) may be operated (e.g., autonomously, semi-autonomously) based on agronomic inferences generated using techniques described herein to perform various remedial actions. As one example, a rover may traverse through a field and apply nitrogen to those portions of the field that were inferred using techniques described herein to be nitrogen deficient.

Figure 6:
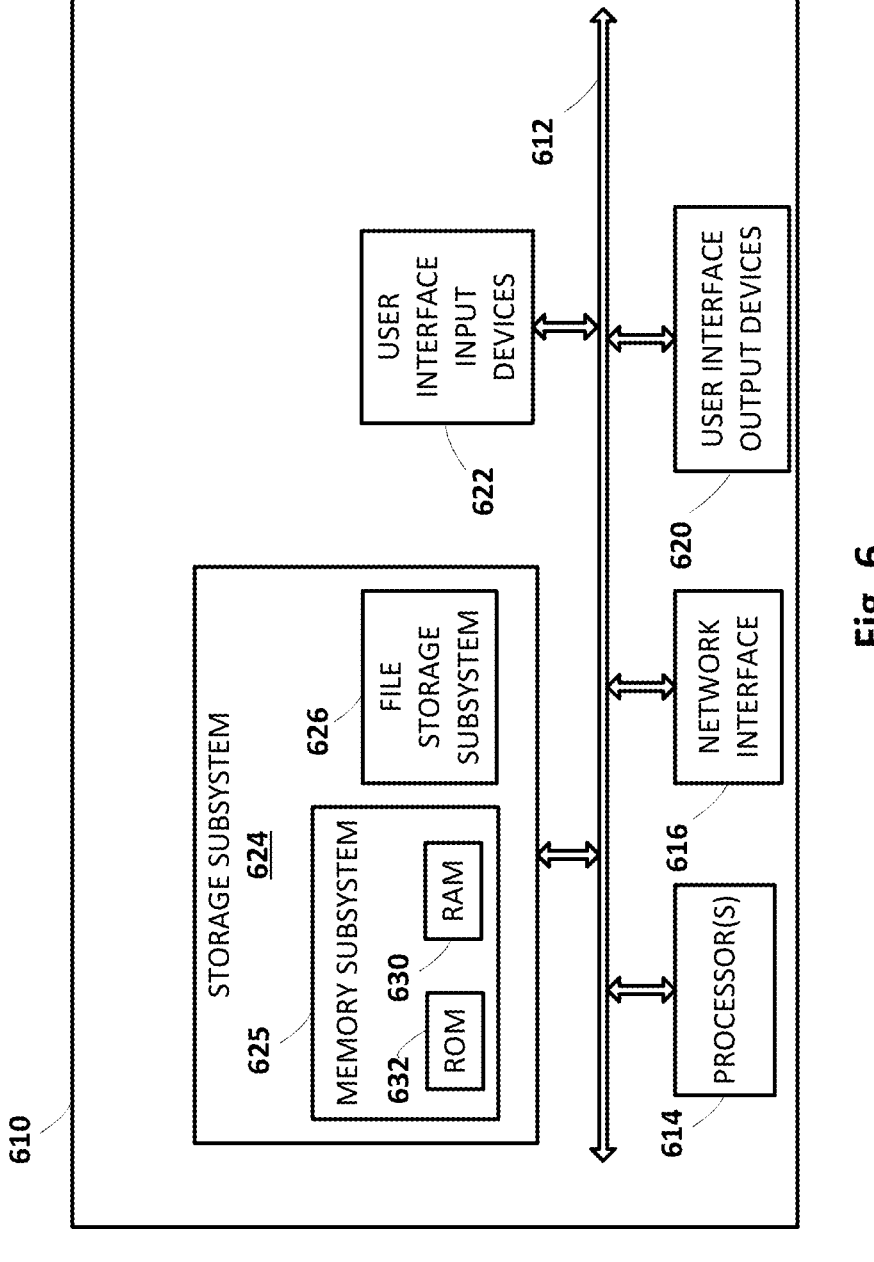
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 500 described herein, as well as to implement various components depicted in FIGS. 1-4.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

sampling a plurality of individual plant components from a plurality of plant components removed from one or more composite plant organs that previously included the plurality of plant components, wherein the one or more composite plant organs are part of crops in a field managed by a grower;

capturing one or more digital images of the sampled one or more plurality of individual plant components;

processing the one or more digital images based on one or more machine learning models, wherein one or more of the machine learning models was trained previously based on training data associating a plurality of reference individual plant components with ground truth agronomic observations about one or more reference composite plant organs that yielded the plurality of reference individual plant components, wherein the processing includes:

generating a plurality of individual plant component embeddings that represent the sampled plurality of individual plant components within the one or more digital images;

determining similarity measures between the plurality of individual plant component embeddings and individual plant component reference embeddings generated previously based on the plurality of reference individual plant components; and based on the similarity measures and at least some of the ground truth agronomic observations about one or more of the reference composite plant organs that yielded the plurality of reference individual plant components, generating one or more agronomic inferences about the one or more composite plant organs that previously included the plurality of plant components; and based on the one or more agronomic inferences, causing one or more computing devices to render output that includes a diagnosis or recommendation for the grower about the field or the crops.

2. The method of claim 1, wherein the output comprises includes subfield recommendations for the field managed by the grower.

3. The method of claim 1, wherein the output includes one or more mid-crop-cycle agronomic recommendations.

4. The method of claim 1, wherein the output includes a local environmental zone map for the field.

5. The method of claim 1, wherein the plurality of individual plant components are corn kernels, and the one or more composite plant organs are ears of corn.

6. The method of claim 1, wherein the plurality of individual plant components are wheat seeds, and the one or more composite plant organs are heads of wheat.

7. The method of claim 1, wherein the plurality of individual plant components are sampled by a component onboard a combine harvester operating in the field.

8. The method of claim 1, wherein the processing includes segmenting the sampled plurality of individual plant components within the one or more digital images.

9. The method of claim 1, wherein the similarity measures are first similarity measures, and further including:

determining second similarity measures between the plurality of individual plant component embeddings; and based on the second similarity measures, clustering the plurality of individual plant component embeddings into clusters, with each cluster representing an archetype composite plant organ.

10. A system comprising one or more processors and memory storing instructions that, in response to execution by the one or more processors, cause the one or more processors to:

sample a plurality of individual plant components from a plurality of plant components removed from one or more composite plant organs that previously included the plurality of plant components, wherein the one or more composite plant organs are part of crops in a field managed by a grower;

capture one or more digital images of the sampled one or more plurality of individual plant components;

process the one or more digital images based on machine learning models, wherein one or more of the machine learning models was trained previously based on training data associating a plurality of reference individual plant components with ground truth agronomic observations about one or more reference composite plant organs that yielded the plurality of reference individual plant components, wherein to process includes to:

generate a plurality of individual plant component embeddings that represent the sampled plurality of individual plant components within the one or more digital images;

determine similarity measures between the plurality of individual plant component embeddings and individual plant component reference embeddings generated previously based on the plurality of reference individual plant components; and based on the similarity measures and at least some of the ground truth agronomic observations about one or more of the reference composite plant organs that yielded the plurality of reference individual plant components, generate one or more agronomic inferences about the one or more composite plant organs that previously included the plurality of plant components; and based on the one or more agronomic inferences, cause one or more computing devices to render output that includes a diagnosis or recommendation for the grower about the field or the crops.

11. The system of claim 10, wherein the output includes subfield recommendations for the field managed by the grower, one or more mid-crop-cycle agronomic recommendations, or a local environmental zone map for the field.

12. The system of claim 10, wherein the plurality of individual plant components are corn kernels, and the one or more composite plant organs are ears of corn.

13. The system of claim 10, wherein the plurality of individual plant components are wheat seeds, and the one or more composite plant organs are heads of wheat.

14. The system of claim 10, wherein the plurality of individual plant components are sampled by a component onboard a combine harvester operating in the field.

15. The system of claim 10, wherein the processing includes segmenting the sampled plurality of individual plant components within the one or more digital images.

16. At least one non-transitory computer-readable medium comprising instructions that, when executed by one or more processors, cause the one or more processors to:

obtain one or more digital images of a plurality of individual plant components that were sampled from a plurality of plant components removed from one or more composite plant organs that previously included the plurality of plant components, wherein the one or more composite plant organs are part of crops in a field managed by a grower;

process the one or more digital images based on one or more machine learning models, wherein one or more of the machine learning models was trained previously based on training data associating a plurality of reference individual plant components with ground truth agronomic observations about one or more reference composite plant organs that yielded the plurality of reference individual plant components, wherein to process includes to:

generate a plurality of individual plant component embeddings that represent the sampled plurality of individual plant components within the one or more digital images;

determine similarity measures between the plurality of individual plant component embeddings and individual plant component reference embeddings generated previously based on the plurality of reference individual plant components; and based on the similarity measures and at least some of the ground truth agronomic observations about one or more of the reference composite plant organs that yielded the plurality of reference individual plant components, generate one or more agronomic inferences about the one or more composite plant organs that previously included the plurality of plant components; and based on the one or more agronomic inferences, cause one or more computing devices to render output that includes a diagnosis or recommendation for the grower about the field or the crops.

17. The non-transitory computer-readable medium of claim 16, wherein the output includes subfield recommendations for the field managed by the grower, one or more mid-crop-cycle agronomic recommendations, or a local environmental zone map for the field.

18. The non-transitory computer-readable medium of claim 16, wherein the plurality of individual plant components are corn kernels, and the one or more composite plant organs are ears of corn.

19. The non-transitory computer-readable medium of claim 16, wherein the plurality of individual plant components are wheat seeds, and the one or more composite plant organs are heads of wheat.

20. The non-transitory computer-readable medium of claim 16, wherein the plurality of individual plant components are sampled by a component onboard a combine harvester operating in the field.

* * * * *